US005968885A

United States Patent [19]

Del Duca et al.

[11] Patent Number: 5,968,885

[45] Date of Patent: Oct. 19, 1999

[54] BLEACHING COMPOSITIONS

[75] Inventors: Valerio Del Duca, Massa Lubrense; Stefano Scialla; Raffaele Scoccianti, both of Rome, all of Italy

[73] Assignee: Procter & Gamble Co., Cincinnati, Ohio

[21] Appl. No.: 08/981,372

[22] PCT Filed: Jun. 26, 1996

[86] PCT No.: PCT/US96/10906

§ 371 Date: Dec. 18, 1997

§ 102(e) Date: Dec. 18, 1997

[87] PCT Pub. No.: WO97/01506

PCT Pub. Date: Jan. 16, 1997

[30] Foreign Application Priority Data

Apr. 22, 1996 [EP] European Pat. Off. .............. 96870054

[51] Int. Cl.[6] ........................... C11D 3/395; C11D 17/00; C11D 3/39; C01B 3/00

[52] U.S. Cl. ........................... 510/375; 510/417; 510/433

[58] Field of Search .................................... 510/367, 375, 510/417, 433

[56] References Cited

U.S. PATENT DOCUMENTS

| | | | |
|---|---|---|---|
| 4,412,934 | 11/1983 | Chung et al. | 252/186.38 |
| 4,915,854 | 4/1990 | Mao et al. | 252/8.8 |
| 5,174,927 | 12/1992 | Honsa | 252/543 |
| 5,318,728 | 6/1994 | Surutzidis et al. | 252/548 |

*Primary Examiner*—Yogendra Gupta
*Assistant Examiner*—John M Petruncio
*Attorney, Agent, or Firm*—C. Brant Cook; Kim W. Zerby; Jacobus C. Rasser

[57] ABSTRACT

The present invention relates to liquid compositions comprising a peroxygen bleach, a liquid hydrophobic bleach activator and a polyhydroxy fatty acid amide surfactant according to the formula $R^2$—C(O)—N($R^1$)-Z, wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxycarbyl having a linear hydrocarbyl chain with at least 3 hydroxyls directly connected to the chain, or an alkoxylated derivative thereof, said compositions being formulated either as an emulsion or a microemulsion. The present invention further encompasses a process for pretreating soiled fabrics with a liquid composition comprising such a polyhydroxy fatty acid amide surfactant, whereby improved stain removal performance is delivered.

15 Claims, No Drawings

BLEACHING COMPOSITIONS

TECHNICAL FIELD

The present invention relates to stable peroxygen bleach-containing compositions particularly suitable to be used as pretreater.

BACKGROUND

Peroxygen bleach-containing compositions have been extensively described in laundry applications as laundry detergents, laundry additives or even laundry pretreaters.

Indeed, it is known to use liquid compositions comprising a peroxygen bleach and a bleach activator in laundry pretreatment applications. Although said liquid bleaching compositions provide good bleaching performance when used to pretreat a soiled fabric, there is still some room to further improve them regarding for example the stains/soils removal performance delivered when pretreating said soiled fabric.

It is thus an object of the present invention to provide improved stain removal performance on a variety of stains/soils under pretreatment conditions, i.e., when applied directly onto the soiled fabrics, and left to act onto said fabrics before washing said fabrics. More particularly, it is an object of the present invention to provide liquid compositions containing a peroxygen bleach and a liquid hydrophobic bleach activator, which deliver improved stain removal performance on a variety of stains/soils under pretreatment conditions while not compromising on their bleaching performance.

It has now been found that the above object can be met by using a liquid composition comprising a polyhydroxy fatty acid amide surfactant to pretreat soiled fabrics. Indeed, it has been found that the addition of a polyhydroxy fatty acid amide surfactant, as defined hereinafter, in a liquid composition, e.g., in a liquid composition comprising a peroxygen bleach and optionally a liquid hydrophobic bleach activator, allows to deliver improved stain removal performance on fabrics under pretreatment conditions, as compared to the stain removal performance delivered by the same composition without said polyhydroxy fatty acid amide surfactant, or to the same composition but with another surfactant like for instance a nonionic ethoxylated surfactant ($C_{14}$–$C_{15}$ 7EO) instead of said polyhydroxy fatty acid amide surfactant. Thus, in its broadest aspect, the present invention encompasses the use of said polyhydroxy fatty acid amide surfactant, in a liquid composition, for improving the stain removal performance of said composition under pretreatment conditions, on a variety of stains. The present invention also encompasses liquid compositions comprising said polyhydroxy fatty acid amide surfactant, a peroxygen-bleach and a liquid hydrophobic bleach activator. Indeed, it has further been found that the addition of said polyhydroxy fatty acid amide surfactants, in the liquid peroxygen bleach-containing compositions of the present invention comprising said liquid hydrophobic bleach activator, contributes to emulsify said hydrophobic bleach activator so that said compositions are formulated either as microemulsions or as emulsions. Thus, the compositions according to the present invention allow to provide improved stain removal performance when pretreating soiled fabrics while exhibiting also excellent chemical stability, even upon prolonged storage periods.

An advantage of the present invention is that the improved stain removal performance obtained when pretreating fabrics with the compositions of the present invention is noticeable on a variety of stains/soils including greasy/oil stains, like make-up, lipstick, dirty motor oil and mineral oil, greasy food like mayonnaise and spaghetti sauce, bleachable stains like tea and enzymatic stains like blood and grass.

EP-A-598 170 discloses an emulsion comprising hydrogen peroxide or a source thereof, a hydrophobic liquid ingredient and an emulsifying system comprising two nonionic surfactants with different HLB (hydrophilic lipophilic balance). No polyhydroxy fatty acid amide surfactants are disclosed.

Co-pending European patent application number 95203330.6 discloses a liquid bleaching composition comprising hydrogen peroxide, a liquid hydrophobic bleach activator, said composition being formulated as a microemulsion of said hydrophobic liquid bleach activator in a matrix comprising water, said hydrogen peroxide, a hydrophilic surfactant system comprising a nonionic surfactant and an anionic surfactant. No polyhydroxy fatty acid amide surfactants are disclosed.

SUMMARY OF THE INVENTION

The present invention encompasses a liquid composition comprising a peroxygen bleach, a liquid hydrophobic bleach activator and a polyhydroxy fatty acid amide surfactant according to the formula $R^2$—C(O)—N($R^1$)-Z, wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof, said composition being formulated either as a microemulsion or as an emulsion.

The present invention also encompasses a process of pretreating soiled fabrics with a liquid composition comprising a polyhydroxy fatty acid amide surfactant according to the formula $R^2$—C(O)—N($R^1$)-Z, wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof, said process comprising the steps of applying said composition in its neat form onto the fabric and allowing said composition to remain in contact with said fabric, before said fabric is washed.

The present invention further encompasses the use of a polyhydroxy fatty acid amide surfactant according to the formula $R^2$—C(O)—N($R^1$)-Z, wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof, in a liquid composition, preferably in a liquid peroxygen bleach-containing composition, for improving the stain removal performance of said composition under pretreatment conditions, i.e., when pretreating a soiled fabric with said composition before said fabric is washed.

DETAILED DESCRIPTION OF THE INVENTION

As an essential element the compositions of the present invention comprise a peroxygen bleach. Preferred peroxygen bleach is hydrogen peroxide, or a water soluble source thereof, or mixtures thereof. Hydrogen peroxide is most preferred to be used in the compositions of the present invention. Indeed, the presence of peroxygen bleach, preferably hydrogen peroxide, provides strong cleaning benefits which are particularly noticeable in laundry applications. As used herein a hydrogen peroxide source refers to any compound which produces hydrogen peroxide when said compound is in contact with water.

Suitable water-soluble sources of hydrogen peroxide for use herein include percarbonates, persilicate, persulphate such as monopersulfate, perborates, peroxyacids such as diperoxydodecandioic acid (DPDA), magnesium perphtalic acid, perbenzoic and alkylperbenzoic acids, and mixtures thereof.

Typically, the compositions of the present invention comprise from 0.01% to 20% by weight of the total composition of said peroxygen bleach or mixtures thereof, preferably from 1% to 15%, and most preferably from 2% to 10%.

As another ingredient, the compositions of the present invention comprise a liquid hydrophobic bleach activator or mixtures thereof. By "bleach activator", it is meant herein a compound which reacts with hydrogen peroxide to form a peracid. The peracid thus formed constitutes the activated bleach. By "hydrophobic bleach activator", it is meant herein a bleach activator which is not substantially and stably miscible with water. Typically, such hydrophobic bleach activators have a secondary HLB (hydrophilic lipophilic balance) below 11, preferably below 10. Secondary HLB is known to those skilled in the art and is defined for example in "Emulsions theory and practice" by P. Becher, Reinhold, New York, 1957, or in "Emulsion science" by P. Sherman, Academic Press, London, 1969.

Suitable hydrophobic bleach activators to be used herein include those belonging to the class of esters, amides, imides, or anhydrides. Examples of suitable compounds of this type are disclosed in British Patent GB 1 586 769 and GB 2 143 231 and a method for their formation into a prilled form is described in European Published Patent Application EP-A-62 523. Suitable examples of such compounds to be used herein are tetracetyl ethylene diamine (TAED), sodium 3,5,5 trimethyl hexanoyloxybenzene sulphonate, diperoxy dodecanoic acid as described for instance in U.S. Pat. No. 4,818,425 and nonylamide of peroxyadipic acid as described for instance in U.S. Pat. No. 4,259,201 and n-nonanoyloxybenzenesulphonate (NOBS). Also suitable are N-acyl caprolactams selected from the group consisting of substituted or unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam pentanoyl caprolactam or mixtures thereof. A particular family of bleach activators of interest was disclosed in EP 624 154, and particularly preferred in that family is acetyl triethyl citrate (ATC). Acetyl triethyl citrate has the advantage that it is environmentally friendly as it eventually degrades into citric acid and alcohol. Furthermore, acetyl triethyl citrate has a good hydrolytical stability in the product upon storage and it is an efficient bleach activator. Finally, it provides good building capacity to the composition.

The compositions according to the present invention comprise from 0.1% to 20% by weight of the total composition of said liquid hydrophobic bleach activator, or mixtures thereof, preferably from 1% to 10%, and more preferably from 1.5% to 7%.

As another essential ingredient, the compositions of the present invention comprise a polyhydroxy fatty acid amide surfactant, or mixtures thereof, according to the formula $$R^2—C(O)—N(R^1)\text{-}Z,$$

wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof.

Preferably, $R^1$ is $C_1$–$C_4$ alkyl, more preferably $C_1$ or $C_2$ alkyl and most preferably methyl, $R^2$ is a straight chain $C_7$–$C_{19}$ alkyl or alkenyl, preferably a straight chain $C_9$–$C_{18}$ alkyl or alkenyl, more preferably a straight chain $C_{11}$–$C_{18}$ alkyl or alkenyl, and most preferably a straight chain $C_{11}$–$C_{14}$ alkyl or alkenyl, or mixtures thereof. Z preferably will be derived from a reducing sugar in a reductive amination reaction; more preferably Z is a glycityl. Suitable reducing sugars include glucose, fructose, maltose, lactose, galactose, mannose and xylose. As raw materials, high dextrose corn syrup, high fructose corn syrup, and high maltose corn syrup can be utilised as well as the individual sugars listed above. These corn syrups may yield a mix of sugar components for Z. It should be understood that it is by no means intended to exclude other suitable raw materials. Z preferably will be selected from the group consisting of $—CH_2—(CHOH)_n—CH_2OH$, $—CH(CH_2OH)—(CHOH)_{n-1}—CH_2OH$, $—CH_2—(CHOH)_2—(CHOR')(CHOH)—CH_2OH$, where n is an integer from 3 to 5, inclusive, and R' is H or a cyclic or aliphatic monosaccharide, and alkoxylated derivatives thereof. Most preferred are glycityls wherein n is 4, particularly $CH_2—(CHOH)_4—CH_2OH$.

In formula $R^2—C(O)—N(R^1)\text{-}Z$, $R^1$ can be, for example, N-methyl, N-ethyl, N-propyl, N-isopropyl, N-butyl, N-2-hydroxy ethyl, or N-2-hydroxy propyl.

$R^2—C(O)—N<$ can be, for example, cocamide, stearamide, oleamide, lauramide, myristamide, capricamide, palmitamide, tallowamide and the like.

Z can be 1-deoxyglucityl, 2-deoxyfructityl, 1-deoxymaltityl, 1-deoxylactityl, 1-deoxygalactityl, 1-deoxymannityl, 1-deoxymaltotriotityl and the like.

Suitable polyhydroxy fatty acid amide surfactants to be used herein may be commercially available under the trade name HOE® from Hoechst.

Methods for making polyhydroxy fatty acid amide surfactants are known in the art. In general, they can be made by reacting an alkyl amine with a reducing sugar in a reductive amination reaction to form a corresponding N-alkyl polyhydroxyamine, and then reacting the N-alkyl polyhydroxyamine with a fatty aliphatic ester or triglyceride in a condensation/amidation step to form the N-alkyl, N-polyhydroxy fatty acid amide product. Processes for making compositions containing polyhydroxy fatty acid amides are disclosed for example in GB patent specification 809,060, published Feb. 18, 1959, by Thomas Hedley & Co., Ltd., U.S. Pat. No. 2,965,576, issued Dec. 20, 1960 to E. R. Wilson, U.S. Pat. No. 2,703,798, Anthony M. Schwartz, issued Mar. 8, 1955, U.S. Pat. No. 1,985,424, issued Dec. 25, 1934 to Piggott and WO92/06070, each of which is incorporated herein by reference.

Typically, the compositions of the present invention comprise from 0.01% to 30% by weight of the total composition of said polyhydroxy fatty acid amide surfactants, or mixtures thereof, preferably from 0.1% to 20%, and more preferably from 0.5% to 15%.

It has now been found that by adding said polyhydroxy fatty acid amide surfactant in a liquid composition comprising a peroxygen bleach and a liquid hydrophobic bleach activator, improved stain removal performance is obtained with said composition when used to pretreat a soiled fabric before said fabric is washed, as compared to the stain removal performance delivered with the same composition without said polyhydroxy fatty acid amide surfactant, or to the same composition with another hydrophilic surfactant like for instance nonionic ethoxylated surfactant (C14/C15 7EO) instead of said polyhydroxy fatty acid amide surfactant.

By "stain removal performance" it is meant herein stain removal performance on a variety of stains/soils such as greasy/oily stains and/or bleachable stains and/or enzymatic stains.

By "greasy/oily stains" it is meant herein any soil and stain of greasy nature that can be found on a fabric like dirty motor oil, mineral oil, make-up, lipstick vegetal oil, spaghetti sauce, mayonnaise and the like.

Examples of bleachable stains include tea, coffee, wine and the like. Examples of enzymatic stains include grass, chocolate and blood.

The stain removal performance of a composition on a soiled fabric under pretreatment conditions may be evaluated by the following test method. A composition according to the present invention is first applied to a fabric, preferably to the stained portion of said fabric, left to act from about 1 to about 10 minutes, preferably 5 minutes, and said pretreated fabric is then washed according to common washing conditions, at a temperature of from 30° C. to 70° C. for a period of time sufficient to bleach said fabric. The stain removal performance is then evaluated by comparing side by side the soiled fabric pretreated with the composition according to the present invention with those pretreated with the reference, e.g. the same compositions but without any polyhydroxy fatty acid amide surfactants according to the present invention. A visual grading scale may be used to assign differences in panel score units (psu), in a range from 0 to 4.

Actually, it has now been found that improved stain removal performance, is achieved with said polyhydroxy fatty acid amide surfactants when contacting them directly to fabrics before washing/rinsing them. Thus the stain removal performance associated to said polyhydroxy fatty acid amide surfactants is not matrix dependent.

Thus, in its broadest aspect, the present invention encompasses the use of a polyhydroxy fatty acid amide surfactant as defined herein, in a liquid composition, preferably in a peroxygen bleach-containing liquid composition, for improving the stain removal performance of said composition under pretreatment conditions, i.e., when pretreating a soiled fabric with said composition before said fabric is washed.

The peroxygen bleach-containing compositions according to the present invention comprise a liquid hydrophobic bleach activator and are thus formulated either as aqueous emulsions of said liquid hydrophobic bleach activator in a matrix comprising water, the peroxygen bleach and an emulsifying surfactant system comprising said polyhydroxy fatty acid amide surfactant (as a hydrophilic surfactant having an HLB above 10), or as microemulsions of said liquid hydrophobic bleach activator in a matrix comprising water, the peroxygen bleach and a hydrophilic surfactant system comprising at least said polyhydroxy fatty acid amide surfactant.

In the embodiment of the present invention where the peroxygen bleach-containing compositions of the present invention are formulated as aqueous emulsions, said polyhydroxy fatty acid amide surfactant may be used, as sole emulsifying surfactant, to emulsify said hydrophobic bleach activator. Accordingly, if said polyhydroxy fatty acid amide surfactant is present in said emulsions as the sole emulsifying surfactant, it is preferably present at a level of from 1% to 6% by weight of the total composition.

It has now been observed that the polyhydroxy fatty acid amide surfactants as defined herein, even at low levels, allow to improve the physical stability of the emulsions of the present invention, even at higher temperatures (up to 40° C.), as compared to the physical stability of the same compositions without said polyhydroxy fatty acid amide surfactants. Thus, another aspect of the present invention is, the use of a polyhydroxy fatty acid amide surfactant as defined herein, in a liquid emulsion preferably comprising a peroxygen bleach, or a source thereof, and a liquid hydrophobic bleach activator, to improve the physical stability of said emulsion.

Preferred peroxygen bleach-containing emulsions herein comprise an emulsifying surfactant system of at least two different surfactants, i.e. at least a hydrophobic surfactant having an HLB up to 9.5 or mixtures thereof, and at least a hydrophilic surfactant having an HLB above 10, or mixtures thereof, in order to emulsify the liquid hydrophobic bleach activator. Preferred herein, said two different surfactants should have different HLB values (hydrophilic/lipophilic balance) in order to form stable emulsions, and preferably the difference in value of the HLBs of said two surfactants is at least 1, preferably at least 2. Indeed, by appropriately combining at least two of said surfactants with different HLBs in water, emulsions will be formed which do not substantially separate into distinct layers, upon standing for at least two weeks at 40° C.

The preferred emulsions according to the present invention comprise from 1% to 50% by weight of the total composition of said hydrophilic and hydrophobic surfactants, more preferably from 5% to 40% and most preferably from 8% to 30%. The preferred emulsions according to the present invention comprise at least from 0.01% by weight of the total emulsion of said hydrophobic surfactant, or mixtures thereof, preferably at least 2% and more preferably at least 4% and at least from 0.01% by weight of the total emulsion of said hydrophilic surfactant, or mixtures thereof, preferably at least 2%, and more preferably at least 4%.

The hydrophilic surfactants having an HLB above 10 to be used in said emulsions herein are said polyhydroxy fatty acid amide surfactants alone or in mixture with other hydrophilic surfactants having an HLB above 10, preferably hydrophilic nonionic surfactants having an HLB above 10 and more preferably above 10.5. Preferred to be used herein as the hydrophobic surfactants are the hydrophobic nonionic surfactants. Said hydrophobic nonionic surfactants to be used herein have an HLB up to 9.5, preferably below 9.5, more preferably below 9. Indeed, the hydrophobic nonionic surfactants to be used herein have excellent grease cutting properties, i.e. they have a solvent effect which contributes to hydrophobic soils removal. The hydrophobic surfactants act as carrier of the hydrophobic brighteners onto the fabrics allowing thereby said brighteners to work in close proximity with the fabrics surface since the beginning of the wash.

Suitable nonionic surfactants for use herein include alkoxylated fatty alcohols preferably, fatty alcohol ethoxylates and/or propoxylates. Indeed, a great variety of such alkoxylated fatty alcohols are commercially available which have very different HLB values (hydrophilic/lipophilic balance). The HLB values of such alkoxylated nonionic surfactants depend essentially on the chain length of the fatty alcohol, the nature of the alkoxylation and the degree of alkoxylation. Hydrophilic nonionic surfactants tend to have a high degree of alkoxylation and a short chain fatty alcohol, while hydrophobic surfactants tend to have a low degree of alkoxylation and a long chain fatty alcohol. Surfactants catalogs are available which list a number of surfactants including nonionics, together with their respective HLB values.

Suitable chemical processes for preparing the nonionic surfactants for use herein include condensation of corresponding alcohols with alkylene oxide, in the desired proportions. Such processes are well-known to the man skilled in the art and have been extensively described in the art. As an alternative, a great variety of alkoxylated alcohols suitable for use herein is commercially available from various suppliers.

Preferred hydrophobic nonionic surfactants to be used in the emulsions according to the present invention are surfactants having an HLB up to 9 and being according to the formula $RO—(C_2H_4O)_n(C_3H_6O)_mH$, wherein R is a $C_6$ to $C_{22}$ alkyl chain or a $C_6$ to $C_{28}$ alkyl benzene chain, and wherein n+m is from 0.5 to 5 and n is from 0 to 5 and m is from 0 to 5 and preferably n+m is from 0.5 to 4.5 and, n and m are from 0 to 4.5. The preferred R chains for use herein are the $C_8$ to $C_{22}$ alkyl chains. Accordingly, suitable hydrophobic nonionic surfactants for use herein are Dobanol® 91-2.5 (HLB=8.1; R is a mixture of $C_9$ and $C_{11}$ alkyl chains, n is 2.5 and m is 0), or Lutensol® TO3 (HLB=8; R is a mixture of $C_{13}$ and $C_{15}$ alkyl chains, n is 3 and m is 0), or Tergitol® 25L3 (HLB=7.7; R is in the range of $C_{12}$ to $C_{15}$ alkyl chain length, n is 3 and m is 0), or Dobanol® 23-3 (HLB=8.1; R is a mixture of $C_{12}$ and $C_{13}$ alkyl chains, n is 3 and m is 0), or Dobanol® 23-2 (HLB=6.2; R is a mixture of $C_{12}$ and $C_{13}$ alkyl chains, n is 2 and m is 0), or mixtures thereof. Preferred herein are Dobanol® 23-3, or Dobanol® 23-2, Lutensol® TO3, or mixtures thereof. These Dobanol® surfactants are commercially available from SHELL. These Lutensol® surfactants are commercially available from BASF and these Tergitol® surfactants are commercially available from UNION CARBIDE. Other suitable hydrophobic nonionic surfactants to be used herein are non alkoxylated surfactants. An example is Dobanol® 23 (HLB<3).

Preferred hydrophilic nonionic surfactants to be used in the emulsions according to the present invention are surfactants having an HLB above 10 and being according to the formula $RO—(C_2H_4O)_n(C_3H_6O)_mH$, wherein R is a $C_6$ to $C_{22}$ alkyl chain or a $C_6$ to $C_{28}$ alkyl benzene chain, and wherein n+m is from 5 to 11 and n is from 0 to 11 and m is from 0 to 11, preferably n+m is from 6 to 10 and, n and m are from 0 to 10. Throughout this description n and m refer to the average degree of the ethoxylation/propoxylation. The preferred R chains for use herein are the $C_8$ to $C_{22}$ alkyl chains. Accordingly, suitable hydrophilic nonionic surfactants for use herein are Dobanol® 23-6.5 (HLB=11.9; R is a mixture of $C_{12}$ and $C_{13}$ alkyl chains, n is 6.5 and m is 0), or Dobanol® 25-7 (HLB=12; R is a mixture of $C_{12}$ to $C_{15}$ alkyl chains, n is 7 and m is 0), or Dobanol® 45-7 (HLB=11.6; R is a mixture of $C_{14}$ and $C_{15}$ alkyl chains, n is 7 and m is 0), or Dobanol® 91-5 (HLB=11.6; R is a mixture of $C_9$ to $C_{11}$ alkyl chains, n is 5 and m is 0), or Dobanol® 91-6 (HLB=12.5; R is a mixture of $C_9$ to $C_{11}$ alkyl chains, n is 6 and m is 0), or Dobanol® 91-8 (HLB=13.7; R is a mixture of $C_9$ to $C_{11}$ alkyl chains, n is 8 and m is 0), or Dobanol® 91-10 (HLB=14.2; R is a mixture of $C_9$ to $C_{11}$ alkyl chains, n is 10 and m is 0), or mixtures thereof. Preferred herein are Dobanol® 91-10, or Dobanol® 45-7, Dobanol® 23-6.5, or mixtures thereof. These Dobanol® surfactants are commercially available from SHELL. Apart from the hydrophilic nonionic surfactants other hydrophilic surfactants may further be used in the emulsions of the present invention such as anionic surfactants described hereinafter.

The emulsions according to the present invention may further comprise other surfactants on top of said polyhydroxy fatty acid amide surfactant alone or in an emulsifying system further comprising hydrophobic surfactants and optional other hydrophilic surfactants, which should however not significantly alter the weighted average HLB value of the overall emulsion.

In a particularly preferred embodiment of the emulsions of the present invention, wherein the emulsions comprise acetyl triethyl citrate as the bleach activator, an adequate nonionic emulsifying surfactant system on top of said polyhydroxy fatty acid amide surfactant, would comprise a hydrophobic nonionic surfactant with for instance an HLB of 6, such as a Dobanol® 23-2 and a hydrophilic nonionic surfactant with for instance an HLB of 15, such as a Dobanol® 91-10. Other suitable nonionic surfactant systems comprise for example a Dobanol® 23-6.5 (HLB about 12) and a Dobanol® 23 (HLB below 6) or a Dobanol® 45-7 (HLB=11.6) and a Dobanol 23-3 (HLB=8.1).

The preferred making of the preferred emulsions of the present invention, which comprise a liquid hydrophobic bleach activator, includes: (i) premixing the hydrophobic surfactants with the bleach activator and other non-water miscible ingredients if present; (ii) premixing the hydrophilic surfactants (i.e. said polyhydroxy fatty acid amide surfactants with optional other hydrophilic surfactants like hydrophilic nonionic surfactants) with water and subsequently adding the other water soluble ingredients if present; (iii) trimming the pH to preferred value; (iv) including a peroxygen bleach, e.g., hydrogen peroxide, and the hydrophobic phase prepared in step (i). It is important that during the mixing of the two phases, the emulsions be constantly kept under stirring under relatively low stirring energies, preferably 30 minutes at 550 rpm, most preferably 30 minutes at 450 rpm.

In the embodiment of the present invention where the compositions are formulated as emulsions said compositions are opaques. In centrifugation examination, it was observed that said emulsions herein showed no phase separation after 15 minutes at 6000 rpm. Under microscopic examination, said emulsions appeared as a dispersion of droplets in a matrix.

In the embodiment of the present invention where the peroxygen bleach-containing compositions of the present invention are formulated as microemulsions, said peroxygen bleach-containing microemulsions according to the present invention comprise a hydrophilic surfactant system comprising said polyhydroxy fatty acid amide surfactant. Accordingly, if said polyhydroxy fatty acid amide surfactant is present in said microemulsions as the sole emulsifying surfactant, it is preferably present at a level of more than 6% of the total composition up to 15%. A key factor in order to stably incorporate the hydrophobic bleach activator is that said polyhydroxy fatty acid amide surfactant has a different HLB value to that of the hydrophobic activator.

It has now been observed that the polyhydroxy fatty acid amide surfactants as defined herein, even at low levels, allow to improve the physical stability of the microemulsions of the present invention, even at higher temperatures (up to 40° C.), as compared to the physical stability of the same compositions without said polyhydroxy fatty acid amide surfactants. Thus, another aspect of the present invention is, the use of a polyhydroxy fatty acid amide surfactant as defined herein, in a liquid microemulsion preferably comprising a peroxygen bleach, or a source thereof, and a liquid hydrophobic bleach activator, to improve the physical stability of said microemulsion.

The hydrophilic surfactant system emulsifying said hydrophobic bleach activator in the microemulsions of the present invention may further comprise other hydrophilic surfactants like other nonionic hydrophilic surfactants and/or anionic surfactants. A key factor in order to stably incorporate the hydrophobic activator in said microemulsions is that at least one of said surfactants of the hydrophilic surfactant system must have a different HLB value to that of the hydrophobic activator. Indeed, if all said surfactants had the same HLB value as that of the hydrophobic activator, a continuous single phase might be formed, thus lowering the chemical stability of the bleach/bleach activator system. Preferably, at least one of said surfactants has an HLB value which differs by at least 1.0 HLB unit, preferably 2.0 to that of said bleach activator.

Suitable anionic surfactants to be further added in the compositions herein include water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like). Typically, alkyl chains of $C_{12-16}$ are preferred for lower wash temperatures (e.g., below about 50° C.) and $C_{16-18}$ alkyl chains are preferred for higher wash temperatures (e.g., above about 50° C.).

Other suitable anionic surfactants for use herein are water soluble salts or acids of the formula $RO(A)_mSO_3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulfate, $C_{12}$–$C_{18}E(1.0)M)$, $C_{12}$–$C_{18}$ alkyl polyethoxylate (2.25) sulfate, $C_{12}$–$C_{18}E(2.25)M)$, $C_{12}$–$C_{18}$ alkyl polyethoxylate (3.0) sulfate $C_{12}$–$C_{18}E(3.0)$, and $C_{12}$–$C_{18}$ alkyl polyethoxylate (4.0) sulfate $C_{12}$–$C_{18}E(4.0)M)$, wherein M is conveniently selected from sodium and potassium.

Other anionic surfactants useful for detersive purposes can also be used herein. These can include salts (including, for example, sodium, potassium, ammonium, and substituted ammonium salts such as mono-, di- and triethanolamine salts) of soap, $C_9$–$C_{20}$ linear alkylbenzenesulfonates, $C_8$–$C_{22}$ primary or secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl ester sulfonates such as $C_{14-16}$ methyl ester sulfonates; acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO—M^+$ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

Other suitable anionic surfactants to be used herein also include acyl sarcosinate or mixtures thereof, in its acid and/or salt form, preferably long chain acyl sarcosinates having the following formula:

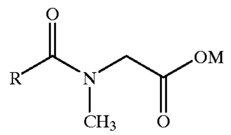

wherein M is hydrogen or a cationic moiety and wherein R is an alkyl group of from 11 to 15 carbon atoms, preferably of from 11 to 13 carbon atoms. Preferred M are hydrogen and alkali metal salts, especially sodium and potassium. Said acyl sarcosinate surfactants are derived from natural fatty acids and the amino-acid sarcosine (N-methyl glycine). They are suitable to be used as aqueous solution of their salt or in their acidic form as powder. Being derivatives of natural fatty acids, said acyl sarcosinates are rapidly and completely biodegradable and have good skin compatibility.

Accordingly, particularly preferred long chain acyl sarcosinates to be used herein include $C_{12}$ acyl sarcosinate (i.e. an acyl sarcosinate according to the above formula wherein M is hydrogen and R is an alkyl group of 11 carbon atoms) and $C_{14}$ acyl sarcosinate (i.e. an acyl sarcosinate according to the above formula wherein M is hydrogen and R is an alkyl group of 13 carbon atoms). $C_{12}$ acyl sarcosinate is commercially available, for example, as Hamposyl L-30® supplied by Hampshire. $C_{14}$ acyl sarcosinate is commercially available, for example, as Hamposyl M-30® supplied by Hampshire.

Suitable other nonionic surfactants for use in the microemulsions herein include the hydrophilic nonionic surfactants as defined herein before for the emulsions.

The preferred making of the microemulsions of the present invention which comprises a liquid hydrophobic bleach activator includes premixing the surfactants with water and subsequently adding the other ingredients including the peroxygen bleach, e.g., hydrogen peroxide, and said hydrophobic bleach activator. Irrespective of this preferred order of addition, it is import ant that during the mixing of the ingredients, the microemulsions be constantly kept under stirring under relatively high stirring energies, preferably 30 minutes at 750 rpm, most preferably 30 minutes at 1000 rpm.

In the embodiment of the present invention where the compositions are formulated as microemulsions said compositions are macroscopically transparent in the absence of opacifiers and dyes. In centrifugation examination, it was observed that said microemulsions herein showed no phase separation after 15 minutes at 6000 rpm. Under microscopic examination, said microemulsions appeared as a dispersion of droplets in a matrix. The matrix is the hydrophilic matrix described hereinbefore, and the droplets are constituted by the liquid hydrophobic bleach activator. We have observed that the particles had a size which is typically around or below 3 micron diameter.

The peroxygen bleach-containing compositions of the present invention formulated in the form of emulsions or microemulsions are chemically stable. By "chemically stable" it is meant herein that said composition of the present invention comprising a peroxygen bleach does not undergo more than 10% available oxygen loss at 50° C. in 2 weeks. The concentration of available oxygen can be measured by chemical titration methods known in the art, such as the iodimetric method, the permanganometric method and the cerimetric method. Said methods and the criteria for the choice of the appropriate method are described for example in "Hydrogen Peroxide", W. C. Schumb, C. N. Satterfield and R. L. Wentworth, Reinhold Publishing Corporation, New York, 1955 and "Organic Peroxides", Daniel Swern, Editor Wiley Int. Science, 1970. Alternatively, the stability of said compositions may also be evaluated by a bulging test method.

Accordingly, said peroxygen bleach-containing compositions of the present invention may be packaged in a given deformable container/bottle without compromising the stability of said container/bottle comprising it upon standing, for long periods of time.

The peroxygen-bleach containing compositions of the present invention formulated either as an emulsion or as a microemulsion may further comprise other surfactants known to those skilled in the art including cationic, zwitterionic and/or amphotheric surfactants. For example, the peroxygen bleach-containing compositions of the present invention may further comprise an amine oxide surfactant according to the formula R1R2R3NO, wherein each of R1, R2 and R3 is independently a $C_1$–$C_{30}$, preferably a $C_1$–$C_{20}$, most preferably a $C_1$–$C_{16}$ hydrocarbon chain. Indeed, we have observed that improved chemical stability, i.e., lower decomposition of the bleach and the bleach activator is obtained by adding such an amine oxide. It is believed that such stability is due to the capacity of the amine-oxide to limit interactions between the bleach and the bleach activator possibly through emulsification. It is believed that this stabilising effect is matrix independent. Amine oxides may be preferably present in amounts up to 10% by weight of the total composition, more preferably from 1% to 3%.

The compositions according to the present invention are aqueous liquid cleaning compositions. Said aqueous compositions should be formulated in the acidic pH up to the neutral pH (pH=7), preferably at a pH of from 0 to 6, more preferably at a pH of from 1 to 6, and most preferably of from 1 to 5. Formulating the compositions of the present invention in the acidic pH range contributes to the stability of said compositions. The pH of the compositions of the present invention can be adjusted by using organic or inorganic acids, or alkalinising agents.

The compositions of the present invention may further comprise optional ingredients like stabilisers, chelating agents, radical scavengers, builders, soil suspenders, dye transfer agents, solvents, brighteners, perfumes, foam suppressors or dyes or mixtures thereof.

The peroxygen bleach-containing compositions of the present invention may comprise a chelating agent or mixtures thereof, as a highly preferred optional ingredient. Chelating agents suitable to be used herein include chelating agents selected from the group of phosphonate chelating agents, amino carboxylate chelating agents, polyfunctionally-substituted aromatic chelating agents, and further chelating agents like glycine, salicylic acid, aspartic acid, glutamic acid, malonic acid, or mixtures thereof. Chelating agents when used, are typically present herein in amounts ranging from 0.001% to 5% by weight of the total composition and preferably from 0.05% to 2% by weight.

Suitable phosphonate chelating agents to be used herein may include ethydronic acid as well as amino phosphonate compounds, including amino alkylene poly (alkylene phosphonate), alkali metal ethane 1-hydroxy diphosphonates, nitrilo trimethylene phosphonates, ethylene diamine tetra methylene phosphonates, and diethylene triamine penta methylene phosphonates. The phosphonate compounds may be present either in their acid form or as salts of different cations on some or all of their acid functionalities. Preferred phosphonate chelating agents to be used herein are diethylene triamine penta methylene phosphonates. Such phosphonate chelating agents are commercially available from Monsanto under the trade name DEQUEST®.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename ssEDDS® from Palmer Research Laboratories.

Suitable amino carboxylates to be used herein include ethylene diamine tetra acetates, diethylene triamine pentaacetates, diethylene triamine pentaacetate (DTPA), N-hydroxyethylethylenediamine triacetates, nitrilotri-acetates, ethylenediamine tetrapropionates, triethylenetetraaminehexa-acetates, ethanol-diglycines, propylene diamine tetracetic acid (PDTA) and methyl glycine di-acetic acid (MGDA), both in their acid form, or in their alkali metal, ammonium, and substituted ammonium salt forms. Particularly suitable amino carboxylates to be used herein are diethylene triamine penta acetic acid, propylene diamine tetracetic acid (PDTA) which is, for instance, commercially available from BASF under the trade name Trilon FS® and methyl glycine di-acetic acid (MGDA).

Particularly preferred chelating agents to be used herein are diethylene triamine methylene phosphonate, ethylene N,N'-disuccinic acid, diethylene triamine pantaacetate, glycine, salicylic acid, aspartic acid, glutamic acid, malonic acid or mixtures thereof and highly preferred is salicylic acid. Salicylic acid may be commercially available from Rhone-Poulenc under the name Salicylic Acid®.

The peroxygen bleach-containing compositions of the present invention may further comprise a radical scavenger, or mixtures thereof, as a highly preferred optional ingredient. Suitable radical scavengers for use herein include the well-known substituted mono and dihydroxy benzenes and their analogs, alkyl and aryl carboxylates and mixtures thereof. Preferred such radical scavengers for use herein include di-tert-butyl hydroxy toluene (BHT), hydroquinone, di-tert-butyl hydroquinone, mono-tert-butyl hydroquinone, tert-butyl-hydroxy anysole, benzoic acid, toluic acid, catechol, t-butyl catechol, benzylamine, 1,1,3-tris(2-methyl-4-hydroxy-5-t-butylphenyl)butane, n-propyl-gallate or mixtures thereof and highly preferred is di-tert-butyl hydroxy toluene. Radical scavengers when used, are typically present herein in amounts ranging from 0.001% to 2% by weight of the total composition and preferably from 0.001% to 0.5% by weight.

The presence of chelating agents and/or radical scavengers allows to provide compositions that are particularly safe to the fabrics treated therewith and to the color, even when used for pretreating a soiled fabric upon prolonged contact times before washing said fabric.

The peroxygen bleach-containing compositions of the present invention may further comprise up to 10%, preferably from 2% to 4% by weight of the total composition of an alcohol according to the formula HO—CR'R"—OH, wherein R' and R" are independently H or a $C_2$–$C_{10}$ hydrocarbon chain and/or cycle. Preferred alcohol according to that formula is propanediol. Indeed, we have observed that these alcohols in general and propanediol in particular also improve the chemical stability of the compositions, i.e. lower the decomposition of the bleach and the bleach activator, as the amine oxides herein above. In addition, said alcohols lower the surface tension of the product, thus preventing superficial film or gel formation. Thus, said alcohols improve the aesthetics of the compositions herein. It is believed that the chemical stabilising effect of said alcohols is twofold. Firstly, they may work as radical scavengers and secondly, they may interact with the hydrogen peroxide preventing or limiting hydrolysis, therefore reducing the rate of peroxide decomposition. It is believed that this improvement in chemical stability obtained by said alcohols is matrix independent.

The peroxygen bleach-containing compositions according to the present invention may further comprise a foam suppressor such as 2-alkyl alkanol, or mixtures thereof, as an optional ingredient. Particularly suitable to be used in the present invention are the 2-alkyl alkanols having an alkyl chain comprising from 6 to 16 carbon atoms, preferably from 8 to 12 and a terminal hydroxy group, said alkyl chain being substituted in the α position by an alkyl chain comprising from 1 to 10 carbon atoms, preferably from 2 to 8 and more preferably 3 to 6. Such suitable compounds are commercially available, for instance, in the Isofol® series such as Isofol® 12 (2-butyl octanol) or Isofol® 16 (2-hexyl decanol). Typically, the compositions of the present invention comprise up to 2% by weight of the total composition of a 2-alkyl alkanol, or mixtures thereof, preferably from 0.05% to 1.5% and more preferably from 0.1% to 0.8%.

Although the preferred application of the compositions described herein is laundry pretreatment, the compositions according to the present invention may also be used as a laundry detergent or as a laundry detergent booster and as a household cleaner in the bathroom or in the kitchen.

The present invention further encompasses a process of pretreating soiled fabrics with a liquid composition comprising a polyhydroxy fatty acid amide surfactant according to the formula $$R^2—C(O)—N(R^1)\text{-}Z,$$

wherein $R^1$ is H, or $C_1$–$C_4$ alkyl, $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, or an alkoxylated derivative thereof, said process comprises the steps of applying said composition in its neat form onto the fabric and allowing said composition to remain in contact with said fabric preferably without leaving said composition to dry onto said fabric, before said fabric is washed. Said composition may remain in contact with said fabric, typically for a period of 1 minute to several hours, preferably 1 minute to 1 hour, more preferably 1 minutes to 30 minutes, and most preferably 2 to 10 minutes. Optionally, when the fabric is soiled with encrusted stains/soils which otherwise would be relatively difficult to remove, said compositions may be rubbed and/or brushed more or less intensively, for example, by means of a sponge or a brush or simply by rubbing two pieces of fabric each against the other. In the preferred process of pretreating soiled fabrics herein the compositions according to the present invention are used.

By "washing" it is to be understood herein to simply rinse the fabrics with water, or the fabrics may be washed with conventional compositions comprising at least one surface active agent, this by the means of a washing machine or simply by hand.

By "in its neat form" it is to be understood that the liquid compositions are applied directly onto the fabrics to be pre-treated without undergoing any dilution, e.g., the compositions according to the present invention are applied as described herein.

According to the process of pretreating soiled fabrics of the present invention, the liquid compositions according to the present invention used in said process should preferably not be left to dry onto the fabrics. Indeed, it has been found that water evaporation contributes to increase the concentration of free radicals onto the surface of the fabrics and, consequently, the rate of chain reaction. It is also speculated that an auto-oxidation reaction occurs upon evaporation of water when the liquid compositions are left to dry onto the fabrics. Said reaction of auto-oxidation generates peroxy-radicals which may contribute to the degradation of cellulose. Thus, not leaving said liquid peroxygen bleach-containing compositions to dry onto the fabric, in the process of pretreating soiled fabrics according to the present invention, may reduce fabric damage what may otherwise result from prolonged contact time between said fabrics and liquid peroxygen bleach-containing compositions.

The present invention will be further illustrated by the followin§7Hbleach examples.

1578Y EXAMPLES

The following compositions were made by mixing the listed ingredients in the listed proportions (weight % unless otherwise specified).

| Compositions | I | II | III | IV | V | VI | VII |
|---|---|---|---|---|---|---|---|
| Alkyl Glucose Amide | 4 | 2.0 | 2.0 | 3.0 | 12 | 3.0 | 3.0 |
| Dobanol ® 45-7 | — | 6.4 | 6.4 | 6.4 | — | | 6.0 |
| Dobanol ® 23-3 | — | 8.6 | 8.6 | 8.6 | — | — | |
| Dobanol ® 23-6.5 | — | — | — | — | — | | 6.0 |
| C25-AE-2.5-S | — | — | 4.0 | 9.0 | — | 6.0 | 6.0 |
| ATC* | 3.5 | 3.5 | 3.5 | 3.5 | 3.5 | 3.5 | 3.5 |
| $H_2O_2$ | 4.0 | 4.0 | 4.0 | 4.0 | 6.0 | 6.0 | 6.0 |
| Water and minors | | | | up to 100% | | | |
| H2SO4 up to pH 4 | | | | | | | |

*ATC is acetyl triethyl citrate.
Dobanol ® 23-3 is a C12–C13 nonionic ethoxylated surfactant with HLB of 8.1.
Dobanol ® 23-6.5 is a C12–C13 nonionic ethoxylated surfactant with HLB of 11.9.
Dobanol ® 45-7 is a C14–C15 nonionic ethoxylated surfactant with HLB of 11.6.

Compositions I to IV are emulsions according to the present invention and compositions V to VII are microemulsions according to the present invention. Excellent stain removal performance has been obtained on a variety of stains including greasy/oily stains like dirty motor oil, make-up, lipstick, spaghetti sauce, bleachable stains like tea and enzymatic stains like grass, blood, when pretreating soiled fabrics with compositions I to VII, as described above, e.g., when leaving said compositions to act onto the fabrics for a contact period of about 5 minutes, before washing said fabrics.

What is claimed is:

1. A liquid pretreater composition for pretreating fabrics prior to washing said fabrics comprising:

a) from 0.01% to 20% by weight of the composition of a peroxygen bleach, or a source thereof;

b) from 0.1% to 20% by weight of the composition of a liquid hydrophobic bleach activator;

c) from 1% to 50% by weight of the composition of an emulsifying surfactant system consisting of 1) at least one hydrophobic surfactant having an HLB of 9.5 or less and 2) at least one hydrophilic surfactant having an HLB above 10 selected from the group consisting of polyhydroxy fatty acid amide surfactants according to the formula:

$$R^2—C(O)—N(R^1)-Z$$

wherein $R^1$ is H, or $R^1$ is $C_1$–$C_4$ hydrocarbyl, 2-hydroxy ethyl, 2-hydroxy propyl or a mixture thereof, $R^2$ is $C_5$–$C_{31}$ hydrocarbyl, and Z is a polyhydroxyhydrocarbyl having a linear hydrocarbyl chain with at least 3 hydroxyls directly connected to the chain, wherein at least one of said hydrophilic surfactants has a different HLB value to that of said liquid hydrophobic bleach activator, such that said liquid composition is formulated as an emulsion or a microemulsion; and d) from 0.001% to 2% by weight of the composition of a radical scavenger selected from the group consisting of di-tert-butyl hydroxy toluene, hydroquinone, di-tert-butyl hydroquinone, mono-tert-butyl hydroquinone, tert-butyl-hydroxy anisole, benzoic acid, toluic acid, catechol, t-butyl catechol, benzylamine, 1,1,3-tris(2-methyl-4-hydroxy-5-t-butylphenyl)butane, n-propyl-gallate and mixtures thereof.

2. A composition according to claim 1 wherein said composition comprises from about 0.1% to about 20% by weight of the total composition of said polyhydroxy fatty acid amide surfactant or mixtures thereof.

3. A composition according to claim 2 wherein said composition comprises from about 0.5% to about 15% by weight of the total composition of said polyhydroxy fatty acid amide surfactant or mixtures thereof.

4. A composition according to claim 1 wherein said liquid hydrophobic bleach activator is acetyl triethyl citrate, tetracetyl ethylene diamine, sodium 3,5,5 trimethyl hexanoyloxybenzene sulphonate, diperoxy dodecanoic acid, nonylamide of peroxyadipic acid, n-nonanoyloxybenzenesulphonate, N-acyl caprolactam, substituted and unsubstituted benzoyl caprolactam, octanoyl caprolactam, nonanoyl caprolactam, hexanoyl caprolactam, decanoyl caprolactam, undecenoyl caprolactam, formyl caprolactam, acetyl caprolactam, propanoyl caprolactam, butanoyl caprolactam, pentanoyl caprolactam or mixtures thereof.

5. A composition according to claim 1 wherein said composition comprises from about 1% to about 10% by weight of the total composition of said liquid hydrophobic bleach activator or mixtures thereof.

6. A composition according to claim 5 wherein said composition comprises from about 1.5% to about 7% by weight of the total composition of said liquid hydrophobic bleach activator or mixtures thereof.

7. A composition according to claim 1 wherein said peroxygen bleach is hydrogen peroxide or a water soluble source thereof, or mixtures thereof.

8. A composition according to claim 1 wherein said composition comprises from about 1% to about 15% by weight of the total composition of said peroxygen bleach or source thereof, or mixtures thereof.

9. A composition according to claim 8 wherein said composition comprises from about 2% to about 10% by weight of the total composition of said peroxygen bleach or source thereof, or mixtures thereof.

10. A composition according to claim 1 wherein said composition has a pH of from about 0 to about 7.

11. A composition according to claim 10 wherein said composition has a pH of from about 0 to about 6.

12. A composition according to claim 10 wherein said composition has a pH of from about 1 to about 6.

13. A composition according to claim 1 wherein said composition further comprises a chelating agent.

14. A composition according to claim 1 wherein in said polyhydroxy fatty acid amide surfactant, $R^1$ is methyl, $R^2$ is straight chain $C_{11}$–$C_{18}$ alkyl or alkenyl, and Z is glycityl.

15. A composition according to claim 14 wherein in said polyhydroxy fatty acid amide surfactant, $R^1$ is methyl, $R^2$ is straight chain $C_{11}$–$C_{14}$ alkyl or alkenyl, and Z is glycityl.

* * * * *